United States Patent [19]

Latsch

[11] 4,377,140
[45] Mar. 22, 1983

[54] METHOD AND APPARATUS FOR CLOSED-LOOP IGNITION TIME CONTROL

[75] Inventor: Reinhard Latsch, Vaihingen, Fed. Rep. of Germany

[73] Assignee: Robert Bosch GmbH, Fed. Rep. of Germany

[21] Appl. No.: 191,749

[22] Filed: Sep. 29, 1980

[30] Foreign Application Priority Data

Sep. 29, 1979 [DE] Fed. Rep. of Germany ....... 2939690

[51] Int. Cl.³ .............................................. F02P 5/04
[52] U.S. Cl. ..................................... 123/415; 123/425
[58] Field of Search ............... 123/415, 416, 417, 425, 123/426; 73/35

[56] References Cited

U.S. PATENT DOCUMENTS

| | | | |
|---|---|---|---|
| 4,130,097 | 12/1978 | Ford | 123/425 |
| 4,186,692 | 2/1980 | Kawamura et al. | 123/275 X |
| 4,232,545 | 11/1980 | Dobler et al. | 73/35 |
| 4,233,943 | 11/1980 | Rogora et al. | 123/425 |
| 4,244,339 | 1/1981 | Gorille | 123/416 |
| 4,257,373 | 3/1981 | McDougal et al. | 123/426 X |
| 4,304,203 | 12/1981 | Garcea et al. | 123/425 X |

FOREIGN PATENT DOCUMENTS 2440275  3/1976  Fed. Rep. of Germany ...... 123/426

Primary Examiner—Tony M. Argenbright
Attorney, Agent, or Firm—Edwin E. Greigg

[57] ABSTRACT

A closed-loop control of the instant of ignition is proposed, in which, with the aid of an ionic current sensor, the end of the ignition phase of an operational mixture of an internal combustion engine is ascertained as an actual value and the instant of ignition is corrected in accordance with the deviation of this actual value from a set-point value relating to the crankshaft angle. In this manner, the instant of ignition in externally ignited internal combustion engines, or the instant of injection in compression ignition engines, can be optimized by simple means, without expensive adjusting devices for the ignition angle or for the instant of injection. In addition, it is possible with a closed-loop control of this kind to perform an optimal adaptation of the ignition to varying peripheral circumstances such as the thermal status of the engine, characteristics of the fuel and of the combustion air, engine wear, and so forth.

17 Claims, 6 Drawing Figures

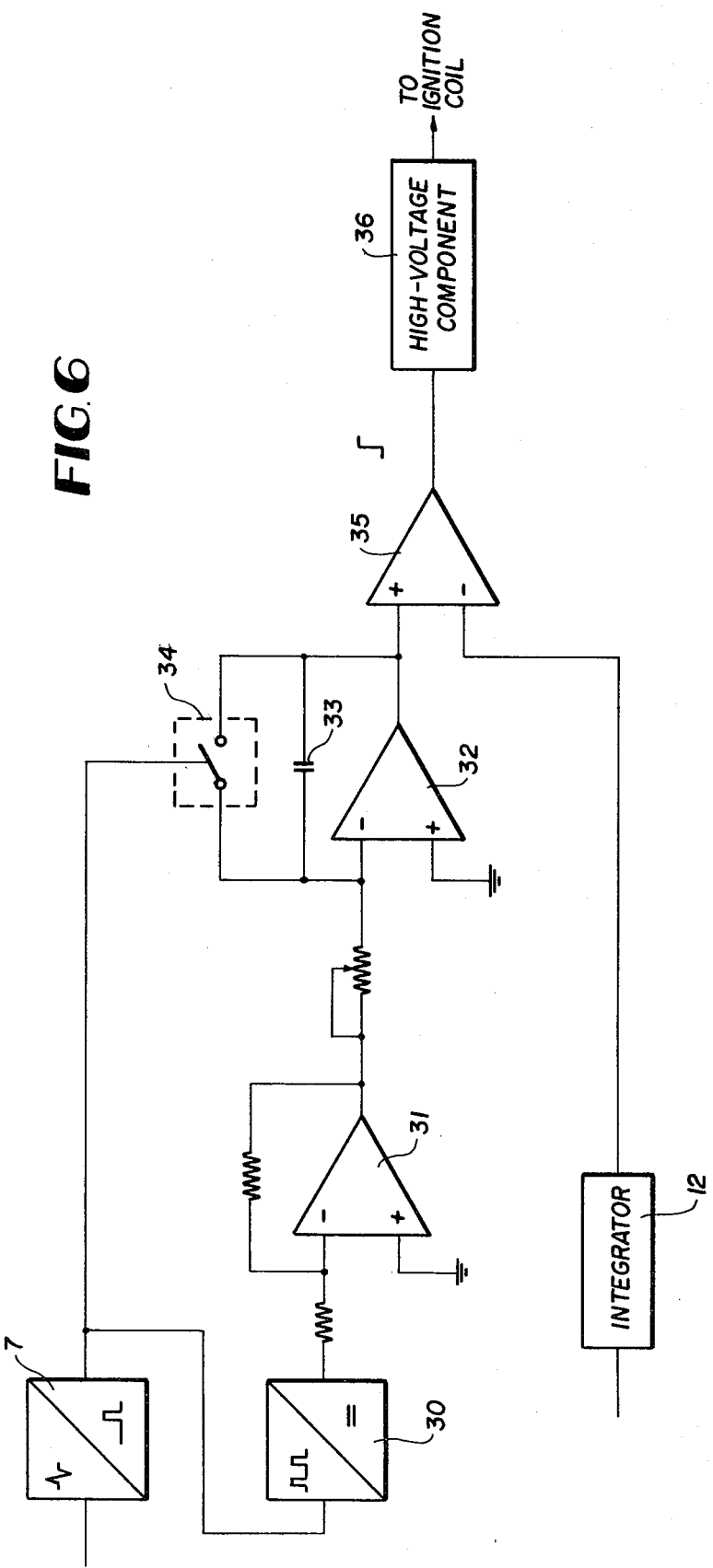

METHOD AND APPARATUS FOR CLOSED-LOOP IGNITION TIME CONTROL

CROSS REFERENCE TO RELATED APPLICATIONS

This application discloses subject matter in common with applications, Ser. No. 191,742 and Ser. No. 191,743. The inventions disclosed in these three applications are commonly assigned.

BACKGROUND OF THE INVENTION

It is known to control the instant of ignition, in internal combustion engines with external supplied ignition, in open- and closed-loop fashion in accordance with various operational parameters of the engine. In addition, the instant of ignition has also been varied in accordance with the composition of the exhaust gas, see German Offenlegungsschrift (laid-open application) 27 400 44.

It is also known to control the instant of ignition in a closed-loop fashion in accordance with the intensity of knocking combustion in such a way that an amount of still-acceptable hard combustion is retained, see German Offenlegungsschrift (laid-open application) 28 01 512.

Furthermore, it is known to utilize ionic current sensors for detecting the combustion process in the combustion chambers of internal combustion engines. As disclosed in German Offenlegungsschrift (laid-open application) 24 43 413, the spreading speed of the flame front is measured in the combustion chamber of the engine during sequential work cycles with the aid of an ionic current sensor after ignition of the operational mixture.

The fluctuations in these spreading speeds or running times provide an indication of the approach toward the running limit of the engine. With an increasing air number $\lambda$, the relative fluctuations in the running time increase.

OBJECT, SUMMARY AND ADVANTAGES OF THE INVENTION

The course of combustion, for instance in an internal combustion engine having externally supplied ignition, can be separated, in accordance with recent observations, into two phases: an ignition phase, and a primary decomposition phase, i.e., a phase in which the primary decomposition of the combustible components of the fuel-air mixture present in the combustion chambers of the engine. While the ignition phase is virtually exclusively determined by the laminar flame velocity in the mixture present in the vicinity of the spark plug and made up of fuel, air and remnant gas, and is thus dependent upon parameters such as the temperature, the pressure, the status of the fuel (that is, the vaporization and pre-reactive status), the primary decomposition phase of the remaining charge is controlled, above all, by the movement of the charge, that is, by the turbulence arising therein. The factors influencing the duration of combustion of the charge as a whole—either slowing it down or speeding it up—are present substantially in the ignition phase. This ignition phase ends approximately when the first 2% of the total charge has attained ignition. The duration of the remaining decomposition phase is then no longer subject to further substantial fluctuations.

It is an object of the invention to detect the end of the ignition phase of the operational mixture delivered to the engine and to utilize this detection in a method and apparatus for controlling the instant of ignition in a closed-loop fashion.

With the method according to the invention, the end of the ignition phase is detected with the aid of an ionic current sensor and, with the aid of the closed-loop control, the end of the ignition phase is established at an ignition angle which is favorable from the standpoint of fuel consumption, that is, at about 10° of crankshaft angle before top dead center. In a similar fashion, the injection time is adjusted in compression ignition internal combustion engines; the injection time being considered as analogous to the instant of ignition in the case of spark ignition.

According to the invention, a set point value signal is generated as a function of crankshaft angle which represents the desired end of the ignition phase, an actual value signal is generated employing an ionic current sensor and the two are compared and a difference signal is generated. From this difference signal the instant of ignition is corrected.

The invention has the advantage that, independently of the flammability of the operational mixture, the end of ignition can be kept within a particular relationship to top dead center. In the extreme case, it is possible to effect ignition not with an ignition spark, but rather with glow ignition and thus to enable operation with a severely leaned-down fuel-air mixture while substantially approaching the lean running limit. Furthermore, an approach up to the running limit is possible, because the ignition interval which is observed to occur at an accelerated rate upon the occurrence of knocking is taken into account by the present invention. In this case, the ignition angle is automatically shifted toward "late". Furthermore, it is possible to eliminate both the expense for a controlled displacement of the ignition angle and the disadvantages of the resultant imprecision caused by manufacturing tolerances and wear during long operation. The same is accordingly true for the adjustment of the injection onset in the case of compression ignition engines.

The invention will be better understood and further objects and advantages thereof will become more apparent from the ensuing detailed description of two preferred embodiments taken in conjunction with the drawings.

BRIEF DESCRIPTION OF THE DRAWINGS

FIG. 6 shows an embodiment of the circuit element 14.

DESCRIPTION OF THE PREFERRED EMBODIMENTS

Figure 1:
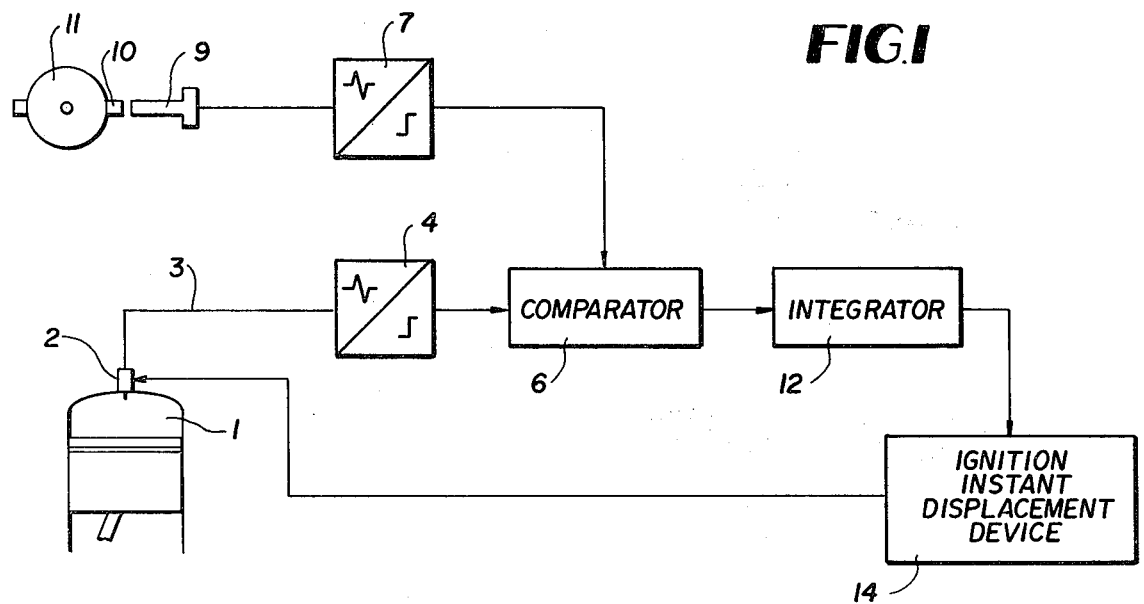
FIG. 1 is a schematic block diagram showing an apparatus for controlling the instant of ignition in closed-loop fashion in accordance with the invention.
Figure 2:
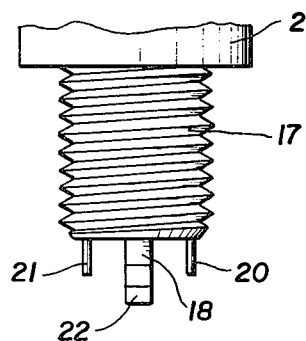
FIG. 2 is a view of a combined spark plug and ionic current sensor used for controlling the instant of ignition in closed-loop fashion in accordance with the invention.

In the exemplary embodiment of FIG. 1, the combustion chamber 1 of an internal combustion engine is shown in schematic form, having a spark plug 2 which is shown on an enlarged scale in FIG. 2. The spark plug 2 is combined with an ionic current sensor which is connected via a line 3 with a pulse shaper circuit 4. The pulse shaper circuit 4 generates an actual value signal. This signal, appearing at the output of the pulse shaper circuit 4, is carried to a comparator circuit 6, which is connected at its other input with a second pulse shaper circuit 7. The input of the second pulse shaper circuit 7 is connected with an inductive transducer 9, which furnishes a signal to the pulse shaper circuit 7 in accordance with the angle indicator mark 10 provided on the crankshaft 11. The signal mark 10 on the crankshaft 11, which can also be an element which is rotatable with the crankshaft, is disposed such that it indicates the optimal ignition instant before TDC for the corresponding cylinder, shown in the drawing, of the engine. The pulse shaper circuit 7 therefore generates a set-point value signal.

The comparator 6 generates a difference signal and this signal is applied to an integrator 12. The integrator 12 is connected to an ignition instant displacement device 14 which is activated in turn by the output signal of the integrator 12.

Figure 3:
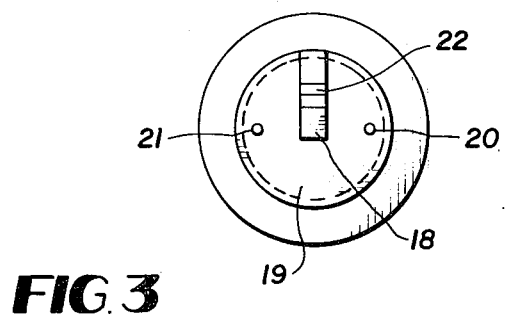
FIG. 3 is a plan view of the spark plug in the exemplary embodiment shown in FIG. 2.

The portion of the spark plug 2 shown in FIG. 2 illustrates an insertion portion 17 of the spark plug 2. This threaded insertion portion 17 surrounds the insulating body 19 (FIG. 3) of the spark plug 2, with a middle electrode 18 serving the purpose of ignition and electrodes 20 and 21 of two ionic current sensors provided on the outermost rim of the insulating body being imbedded in the spark plug 2. A hook-like ground electrode 22 is also provided, as an opposite pole for the middle electrode 18.

The apparatus functions as follows:

With the generation of an ignition spark between the electrodes 18 and 22, a more or less rapid ignition of the operational mixture surrounding the ignition electrodes takes place. The ignition spreads out from the ignition spark to the two ionic current sensors 20 and 21. As is known, there is a high degree of ionization of the mixture components in the ignited mixture, so that as soon as the flame front has reached the ionic current sensor 20 or 21, a sharply increasing ionic current is measured at that point. This effects the generation in the pulse shaper circuit 4 of a pulse-shaped signal which is delivered to the comparator circuit 6. In the second pulse shaper circuit 7 as well, a rectangular signal is generated in accordance with the frequency at which the signal mark 10 passes the inductive transducer 9. The output signal of the second pulse shaper circuit 7 is now compared in the comparator circuit 6 with the output signal of the pulse shaper circuit 4 to ascertain phase coincidence. If there is a deviation in the phase relationship, an output signal is generated by the comparator 6, and this output signal is integrated by the integrator 12. The integrator 12 integrates either in the positive or in the negative direction, depending on the phase relationship, so that the output signal from the integrator 12 adjusts the ignition instant adjustment device 14 in either the positive or the negative direction. The phase relationship is ascertained with the aid of the ionic current sensor 20 or 21, from the set-point value signal provided by the signal mark 10. In this manner, it is possible to adjust the instant of ignition such that the end of the ignition phase occurs at an optimum angular displacement from top dead center. This point may be optimally established with a view to attaining good fuel consumption and to reliably avoiding knocking combustion, by way of example. The signal mark 10 should then be appropriately set in its angular relationship to top dead center.

Figure 5:
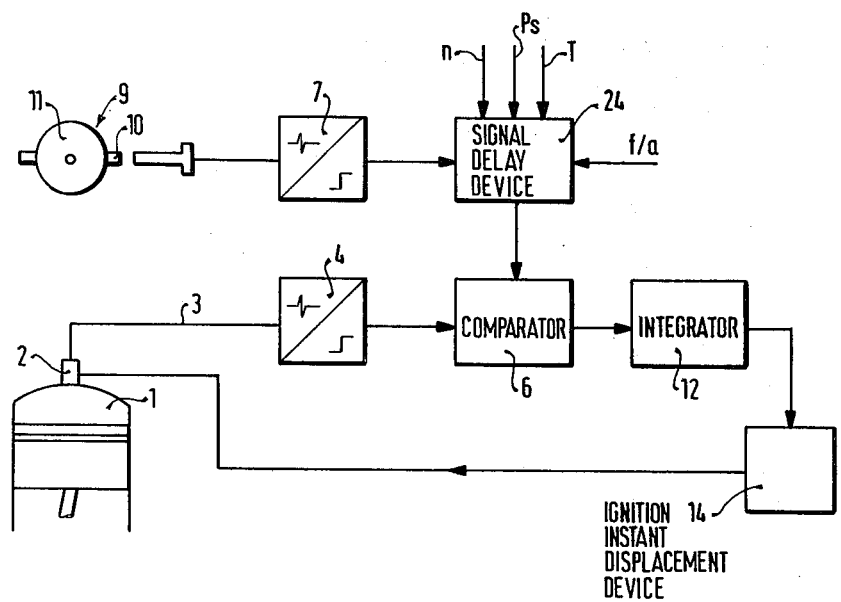
FIG. 5 is a schematic block diagram showing an alternative apparatus for controlling the instant of ignition in closed-loop fashion in accordance with the invention.

In the embodiment shown in FIG. 1, the set-point value transducer for the end of ignition phase comprises the inductive transducer 9. However, according to a further embodiment as shown in FIG. 5, there is provided a signal-delaying device 24 between the second pulse shaper circuit 7 and the comparator circuit 6. With this apparatus, the further transmission of the pulse signal from the pulse shaper circuit 7 to the comparator 6 can be delayed in a known manner and the pulse signal adjusted in accordance with the magnitude of the control variables fed to the signal-delaying device 24. These control variables advantageously exhibit a dependence upon the instantaneous rpm (n) of the engine, the temperature (T) of the engine, the aspirated fuel/air mixture (f/a), or the intake manifold vacuum (Ps). The possibilities are here disclosed for taking into consideration various parameters having an effect on the course of combustion. In this case, naturally the signal mark 10 is shifted forward, in order to be able to perform a practically realizable minimum delay in the further transmission of the signal. Upon starting of the engine, ignition is effected with the ignition angle provided by the inductive transducer 9.

The signal evaluation circuit for the ion current signal, in which the phase of the pulse emitted by the pulse shaper circuit 4 is compared in the comparator device 6 with the phase of the pulse emitted by the pulse shaper circuit 7 and in accordance with the result of comparison a voltage is attained with the help of the integrator 12 which corresponds to the deviation of the pulses from one another, has already been described in British Pat. No. 1,519,005, which corresponds to the German Offenlegungsschrift 24 43 413 mentioned in the Background of the Invention section of the present application. This patent also described a signal-delaying device which in accordance with one or more operating parameters delays the pulse emitted by the pulse shaper circuit 7 and takes the form of a circuit element 24. The various operating parameters may be evaluated with respect to their influence in a known manner via matched intermediate amplifiers or the individual signals, and then combined via a summing circuit to produce a correction value; in accordance with this, the stable time of a multivibrator 22, for instance, can be influenced in a manner known from FIG. 7 of British Pat. No. 1,519,005.

FIG. 6 shows an embodiment of the circuit element 14 by means of which the instant of ignition is determined. In this embodiment, the output of the pulse shaper circuit 7 is connected with a frequency/voltage converter 30, the output of which is carried via an intermediate amplifier 31 to the inverting input of an operational amplifier 32. This latter amplifier 32 is switched as an integrator, in that a capacitor 33 is incorporated in a feedback branch leading from the output of the operational amplifier to the inverting input thereof. The capacitor 33 can be bypassed via a switch 34 and the integrator can thereby be brought into an outset status. The output of the integrator leads to a first input of a comparator 35, the second input of which is connected with the output of the integrator 12. The high-voltage device 36 of an ignition system which is part of the engine is connected to the output of the comparator 35. The switch 34 is likewise switched by the output signal of the pulse shaper circuit 7.

An rpm-dependent voltage is generated with the aid of the frequency/voltage converter 30, and after the setting of the integrator, the integrator performs integration with a predetermined inclination in accordance with this rpm-dependent voltage. As soon as the output voltage of the integrator 32, 33 attains the voltage value indicated by the integrator 12, the comparator switches over; the result is the sudden appearance at its output of a voltage by means of which the high-voltage device of the ignition system is controlled.

The voltage appearing at the output of the integrator 12 corresponds to a time interval between the actual instant of ignition and the set-point instant of ignition. However, since the ignition device has to be adjusted by degrees of angle, this signal value must be brought into some relationship with the time interval from one ignition to another. This is accomplished via the frequency/voltage converter 30 and the integrator 32, 33 connected at its output side. In this combination, the output signal of the integrator 12 becomes a direct measure of the angular interval or in other words for the instant of ignition. The positive jump in the output voltage of the comparator 35 thus triggers the ignition. The integrator 32, 33 is newly set for each measuring interval, under the control of the switch 34, by means of the pulse shaper circuit 7.

In principle, it is entirely sufficient to use a single ionic current sensor, which can also be set into place via a separate bore in the ignition chamber wall. For detecting small charge quantities, it is favorable to combine the ionic current sensor with the spark plug. In the illustrated exemplary embodiments, two ionic current sensors are provided instead of one, as a result of which systematic variations in the course of ignition as a result of altered charge movements are compensated for at various operational states of the engine. By way of example, the average time of arrival of the flame front at the ionic current sensor, or the latest time of arrival thereof, is used as the arrival time. The signals appearing at the two ionic current sensors can be selected in an appropriate manner by means of appropriate devices, which are not shown in further detail here but are already known.

In the method under discussion, it is sufficient in the case of engines having externally supplied ignition to provide one ionic current measuring device, combined for instance with a spark plug, in a single cylinder of a multi-cylinder engine. As an integrator, either an electric integrator with a subsequent electro-mechanical adjustment device or an electro-mechanical adjustment device having integrating properties can be ued.

Figure 4:
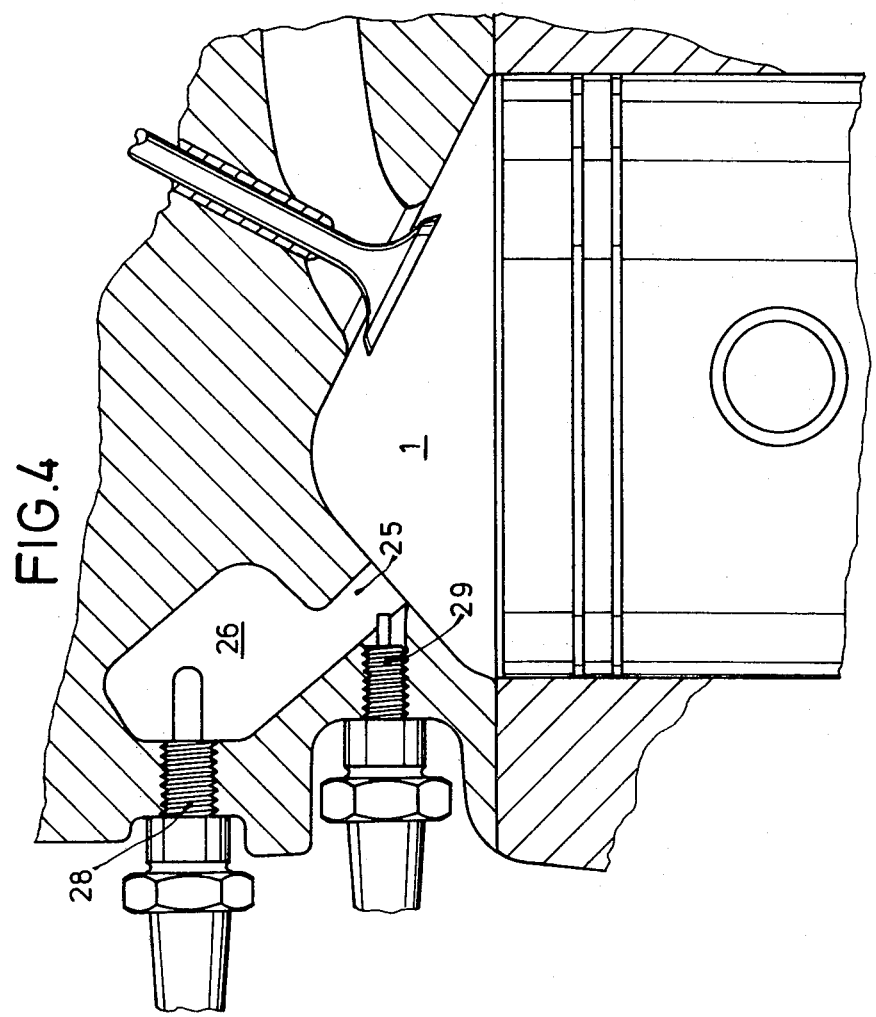
FIG. 4 shows one exemplary embodiment of an apparatus for performing the method according to the invention in an engine having a main combustion chamber equipped with a prechamber.

In FIG. 4, a further possible application is shown. Here, a prechamber 26 communicates with the main combustion chamber 1 of an internal combustion engine via a so-called "shot channel" or connecting channel 25. In compression ignition engines, the fuel is injected into prechamber of this kind. The instant of injection corresponds here to the instant of ignition in engines with externally supplied ignition. Prechambers of this kind, in the newer refinements of externally-ignited engines, act as ignition chambers for the ignition of a portion of the charge introduced into the combustion chamber of the engine. After the ignition has occurred, the gas components flow out, in the form of one or more flame jets, via the connecting channel 25 into the main combustion chamber 1, where a relatively lean fuel-air mixture is caused to ignite. Such devices serve in a known manner to ignite relatively lean fuel-air mixtures, with conditions being created in the ignition chamber under which the fuel-air mixture, which is lean per se, can be ignited better and more rapidly. Either a spark plug or a glow plug 28 can be disposed in such an ignition chamber. In order to detect the end of the ignition of this mixture in the ignition chamber, or in compression ignition engines of the mixture resulting as a consequence of fuel injection, an ionic current sensor 29 is provided in the wall region of the connecting channel 25, this sensor detecting the outflow phase of the mixture from the channel 25. The ionic current detected there is processed in the same manner as has been decribed above.

As a result of the closed-loop control described above, it is possible to omit an expensive ignition time adjusting device and thus to eliminate the associated known disadvantages relating to manufacturing precision and to wear during operation. The opportunity is also afforded of also using glow ignition for igniting the operational mixture, and furthermore of controlling, in open-loop fashion, the ignition of a severely leaned-down operational mixture. In this manner, while assuring good running characteristics in the engine, it is also possible to approach very near the lean running limit of the engine, that is, to lean down the operational mixture accordingly. It is furthermore possible to utilize the same ionic current sensor—that is, its signal—for ascertaining cyclic fluctuations in the duration of ignition and to control the mixture composition in closed-loop fashion in a known manner in accordance with this signal for engine roughness.

The foregoing relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. A method for controlling the instant of ignition in closed-loop fashion in an internal combustion engine, comprising the steps of:
   detecting the ionic current released during combustion of the operational mixture at a predetermined distance from the point of ignition in a combustion chamber of the engine, where the flame front reaching said distance has ignited a mixture volume less than 5% of the total volume;
   generating an actual value signal from the ionic current, representing the end of the ignition phase of the operational mixture;
   generating a set-point value signal before top dead center as a function of crankshaft angle, representing a desired end of the ignition phase of the operational mixture;
   comparing the actual value signal to the set-point value signal and generating a difference signal; and
   correcting the instant of ignition in the combustion chamber of the engine as a function of the difference signal.

2. The method as defined in claim 1, wherein the phase relationship of the actual value signal and the set-point value signal is compared and the difference signal generated.

3. The method as defined in claim 1, wherein the set-point value signal is adjustable as a function of at least one operational parameter which has an effect on the ignition of the operational mixture.

4. The method as defined in claim 2, wherein the set-point value signal is adjustable as a function of rpm.

5. The method as defined in claim 3, wherein the set-point value signal is adjustable as a function of engine temperature.

6. The method as defined in claim 4, wherein the set-point value signal is adjustable as a function of intake manifold vacuum.

7. The method as defined in claim 3, wherein the set-point value signal is adjustable as a function of the aspirated fuel/air mixture.

8. The method as defined in claim 1, wherein the ionic current is detected at two predetermined distances from the point of ignition in the combustion chamber, and wherein the actual value signal generated is an average of the ionic currents detected at the two locations.

9. The method as defined in claim 1, wherein the ionic current is detected at two predetermined distances from the point of ignition in the combustion chamber and at different times, and wherein the actual value signal is generated from the ionic current subsequently detected.

10. An apparatus for controlling the instant of ignition in closed-loop fashion in an internal combustion engine, comprising:
   at least one ionic current sensor located at a predetermined distance from the point of ignition in a combustion chamber of the engine, where the flame front reaching said distance has ignited a mixture volume less than 5% of the total volume, and in the path of the ionic current released during combustion of the operational mixture in the combustion chamber, said at lease one ionic current sensor generating a signal representative of the ionic current detected;
   a pulse shaper connected to each ionic current sensor for receiving the output signal from each ionic current sensor and generating an actual value signal therefrom representing the end of the ignition phase of the operational mixture;
   ignition angle set-point transducer means for generating a set-point value signal before top dead center representing a desired end of the ignition phase of the operational mixture;
   a comparator circuit connected to the output of said pulse shaper and said ignition angle set-point transducer means for comparing the phase relationship between the actual value signal and the set-point value signal, and generating a difference signal as an output;
   an integrator circuit connected to the comparator circuit for integrating the difference signal; and
   an ignition time adjusting device connected to the integrator circuit and being actuated as a function of the difference signal.

11. The apparatus as defined in claim 10, wherein the ignition angle set-point transducer means comprises: a crankshaft angle transducer and a pulse shaper connected thereto and to said comparator circuit.

12. The apparatus as defined in claim 11, wherein the ignition angle set-point transducer means comprises: a crankshaft angle transducer, a pulse shaper connected thereto, and a signal delay circuit connected to the pulse shaper and to the comparator device, said signal delay circuit receiving input signals indicative of various operational parameters affecting the course of combustion for adjusting the set-point value signal received from the pulse shaper as a function of at least one of the operational parameters received.

13. The apparatus as defined in claim 10, wherein said at least one ionic current sensor is disposed in the insulating body of a spark plug.

14. In combination with an internal combustion engine, including at least one main combustion chamber, an associated precombustion chamber and connecting channel connecting the main combustion chamber with the precombustion chamber, an apparatus for controlling the instant of ignition in closed-loop fashion in said associated precombustion chamber, said apparatus comprising:
   an ionic current sensor located in the connecting channel in the path of the ionic current released during combustion of the operational mixture in the precombustion chamber, and where the flame front has ignited a mixture volume less than 5% of the total volume, said ionic current sensor generating a signal representative of the ionic current detected;
   a pulse shaper connected to the ionic current sensor for receiving the output signal therefrom and generating an actual value signal representing the end of the ignition phase of the operational mixture;
   ignition angle set-point transducer means for generating a set-point value signal before top dead center representing a desired end of the ignition phase of the operational mixture;
   a comparator circuit connected to the output of said pulse shaper and said ignition angle set-point transducer means for comparing the phase relationship between the actual value signal and the set-point value signal, and generating a difference signal as an output;
   an integrator circuit connected to the comparator circuit for integrating the difference signal; and
   an ignition time adjusting device connected to the integrator circuit and being actuated as a function of the difference signal.

15. The combination as defined in claim 14, further including a glow plug mounted to the precombustion chamber to provide ignition in the precombustion chamber.

16. The combination as defined in claim 14, further including a spark plug mounted to the precombustion chamber to provide ignition in the precombustion chamber.

17. The combination as defined in claim 14, further including a fuel jet injection nozzle which serves the purpose of ignition.

* * * * *